(12) United States Patent
Chaganti et al.

(10) Patent No.: US 10,972,343 B2
(45) Date of Patent: Apr. 6, 2021

(54) SYSTEM AND METHOD FOR DEVICE CONFIGURATION UPDATE

(71) Applicant: Dell Products L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Hopkinton, MA (US)

( * ) Notice: Subject to any disclaimer, the term of this patent is extended or adjusted under 35 U.S.C. 154(b) by 145 days.

(21) Appl. No.: 16/261,016

(22) Filed: Jan. 29, 2019

(65) Prior Publication Data
US 2020/0244525 A1 Jul. 30, 2020

(51) Int. Cl.
*H04L 12/24* (2006.01)
*H04L 12/911* (2013.01)
*H04L 12/923* (2013.01)

(52) U.S. Cl.
CPC ...... *H04L 41/0816* (2013.01); *H04L 41/0873* (2013.01); *H04L 41/0893* (2013.01); *H04L 47/762* (2013.01); *H04L 47/783* (2013.01)

(58) Field of Classification Search
CPC .... H01L 41/08–41/0866; H01L 47/76–47/786
See application file for complete search history.

(56) References Cited

U.S. PATENT DOCUMENTS

| | | | |
|---|---|---|---|
| 4,780,809 A | 10/1988 | Woffinden et al. | |
| 6,098,098 A * | 8/2000 | Sandahl | H04L 41/082 709/221 |
| 7,636,814 B1 | 12/2009 | Karr et al. | |
| 7,987,353 B2 | 7/2011 | Holdaway et al. | |
| 8,099,571 B1 | 1/2012 | Driscoll et al. | |
| 8,161,255 B2 | 4/2012 | Anglin et al. | |
| 8,190,835 B1 | 5/2012 | Yueh | |
| 8,364,917 B2 | 1/2013 | Bricker et al. | |
| 8,386,930 B2 | 2/2013 | Dillenberger et al. | |
| 8,583,769 B1 | 11/2013 | Peters et al. | |
| 8,788,466 B2 | 7/2014 | Anglin et al. | |
| 8,868,987 B2 | 10/2014 | Wagner | |
| 8,874,892 B1 | 10/2014 | Chan et al. | |

(Continued)

OTHER PUBLICATIONS

"Make more time for the work that matters most", retrieved on-line Mar. 4, 2019 at https://asana.com/ (5 pages).

(Continued)

*Primary Examiner* — Clayton R Williams
(74) *Attorney, Agent, or Firm* — Chamberlain, Hrdlicka, White, Williams & Aughtry

(57) ABSTRACT

A configurable device for use in a solution architecture includes computing resources. The configurable device further includes a computing resources state manager. The computing resources state manager obtains an out-of-band modification to the computing resources. The computing resources state manager, in response to obtaining the out-of-band modification, generates an out-of-band configuration based on the out-of-band modification. The computing resources state manager further, in response to obtaining the out-of-band modification, updates restoration information for the computing resources based on the out-of-band configuration.

20 Claims, 13 Drawing Sheets

(56) References Cited

U.S. PATENT DOCUMENTS

| | | |
|---|---|---|
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,409,778 B1 | 9/2019 | Zhao et al. |
| 10,503,413 B1 | 12/2019 | Gal et al. |
| 10,503,611 B1 | 12/2019 | Srivastav et al. |
| 2001/0044879 A1 | 11/2001 | Moulton et al. |
| 2003/0058277 A1 | 3/2003 | Bowman-Amuah |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2005/0076049 A1 | 4/2005 | Qubti et al. |
| 2007/0283011 A1* | 12/2007 | Rakowski ............ H04L 67/125 709/225 |
| 2008/0244204 A1 | 10/2008 | Cremelie et al. |
| 2009/0077165 A1 | 3/2009 | Rhodes et al. |
| 2009/0094250 A1 | 4/2009 | Dhuse et al. |
| 2009/0265360 A1 | 10/2009 | Bachwani et al. |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0161000 A1 | 6/2015 | Kim et al. |
| 2015/0220400 A1 | 8/2015 | Resch et al. |
| 2015/0355980 A1 | 12/2015 | Volvovski et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1 | 4/2019 | Owen et al. |
| 2019/0109772 A1 | 4/2019 | Lipstone et al. |
| 2019/0197023 A1 | 6/2019 | Chennamsetty et al. |
| 2019/0379588 A1 | 12/2019 | Rao |
| 2020/0050689 A1 | 2/2020 | Tal et al. |

OTHER PUBLICATIONS

"Project Management Redefined", retrieved on-line Mar. 4, 2019 at https://www.robohead.net/features-2/ (2 pages).

"Features" Project Management Tools, retrieved on-line Mar. 4, 2019 at https://www.proworkflow.com/features-project-management-tools/ (7 pages).

Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (D01:10.1109/SRDS.2018.00028).

* cited by examiner

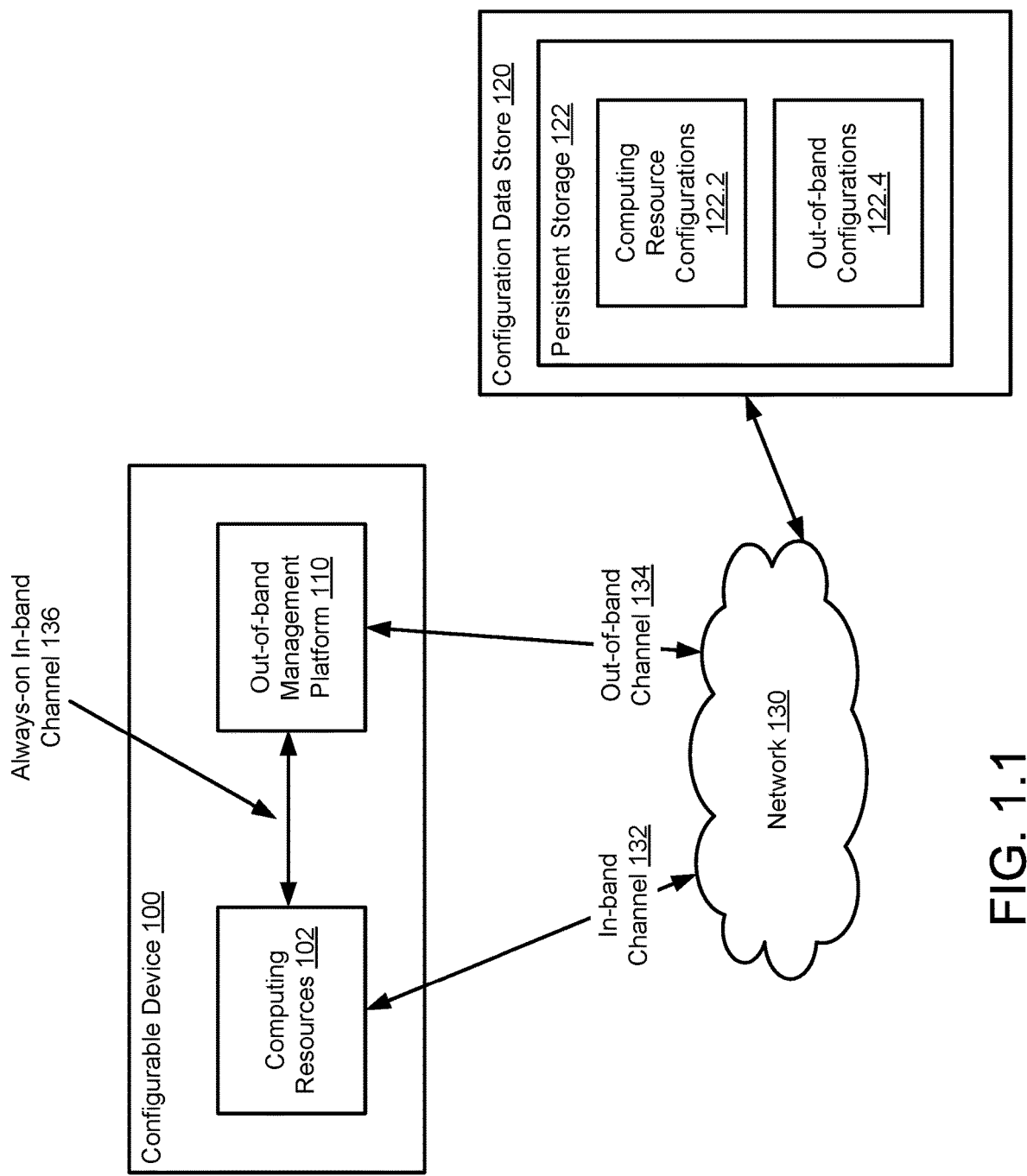
FIG. 1.1

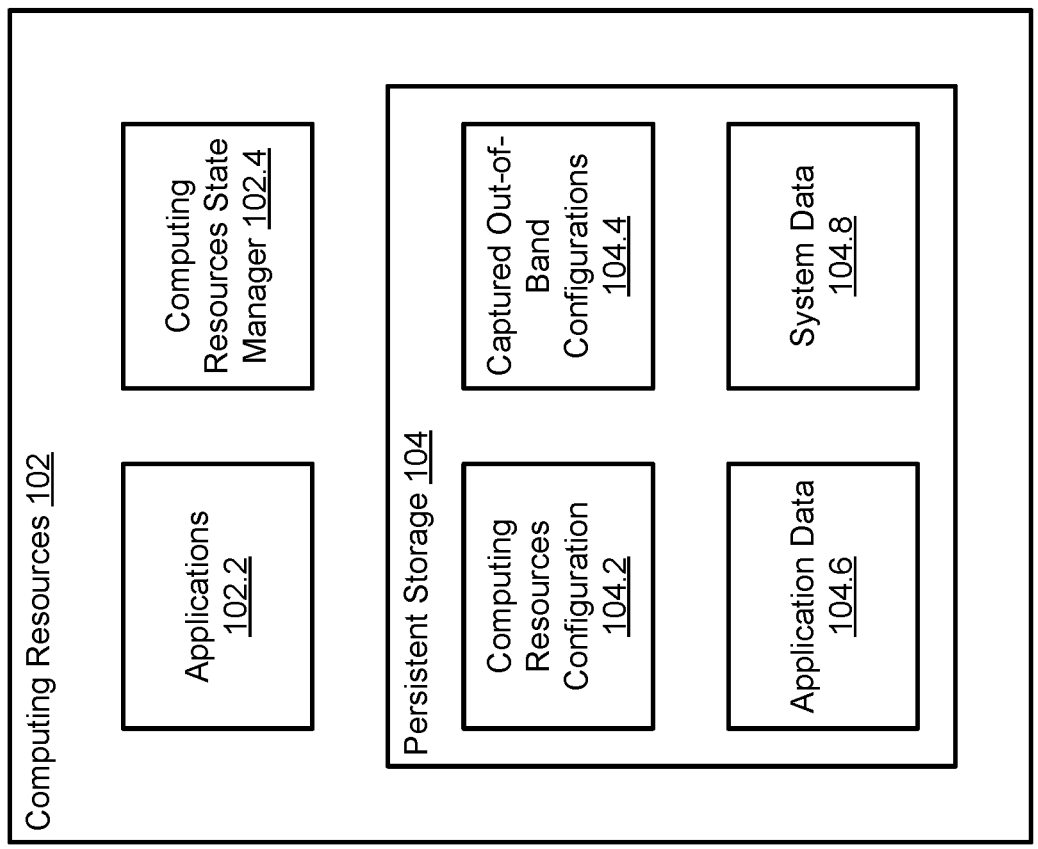
FIG. 1.2

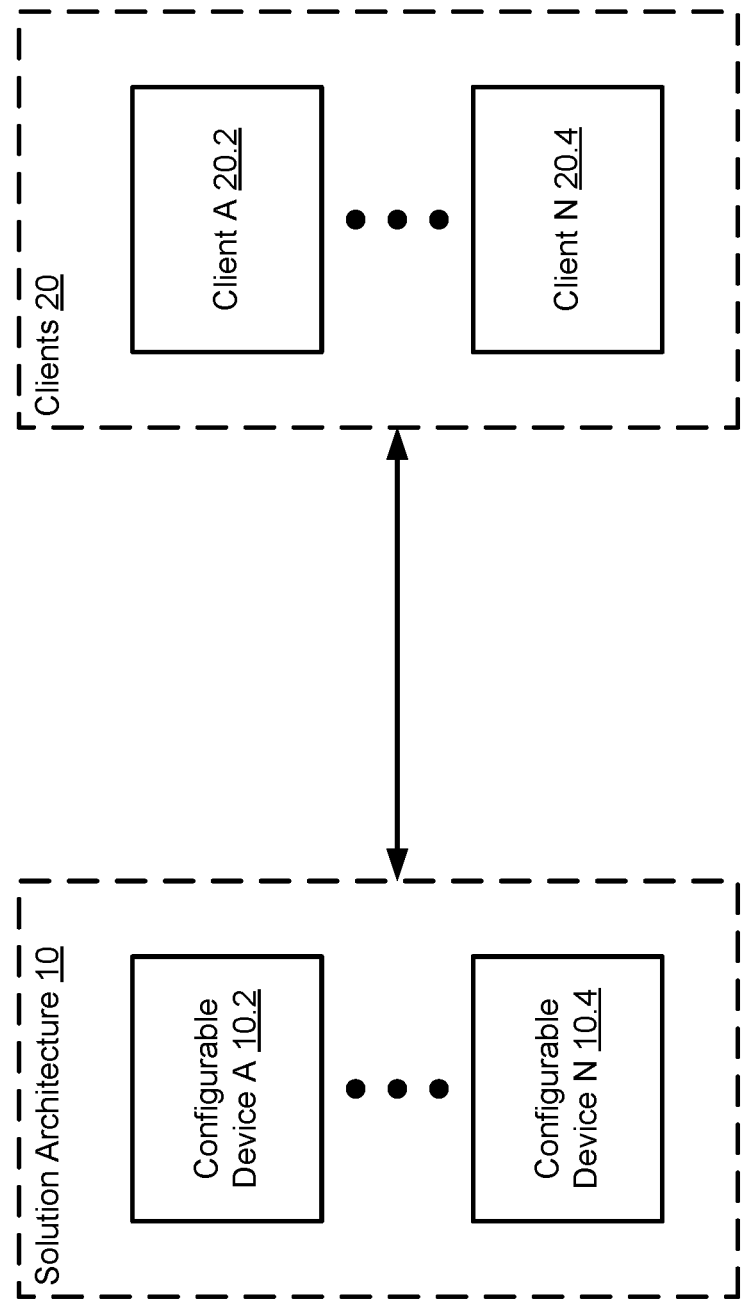
FIG. 1.3

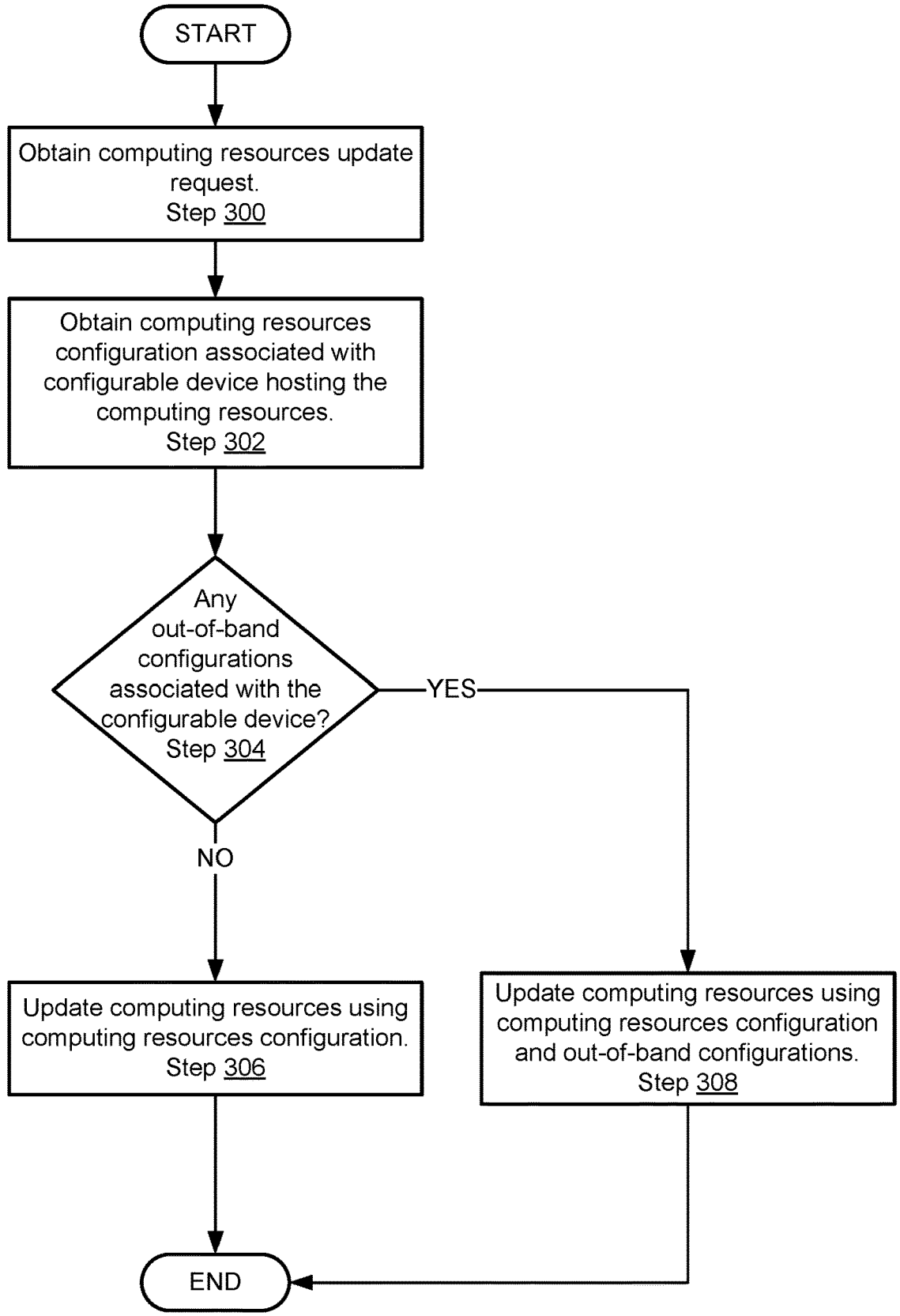
FIG. 3.1

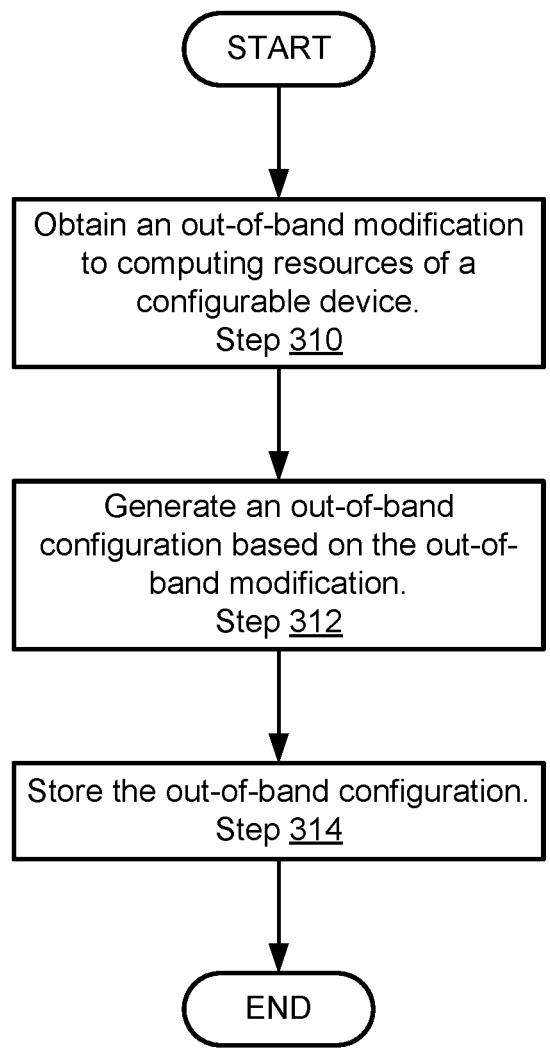
FIG. 3.2

Example Computing Resources 400

Processor 402.2

Memory 402.4

Web Page Server 404.2

Database Manager 404.4

Computing Resources State Manager 406.2

Persistent Storage 408

Database Archive 408.2

FIG. 4.1

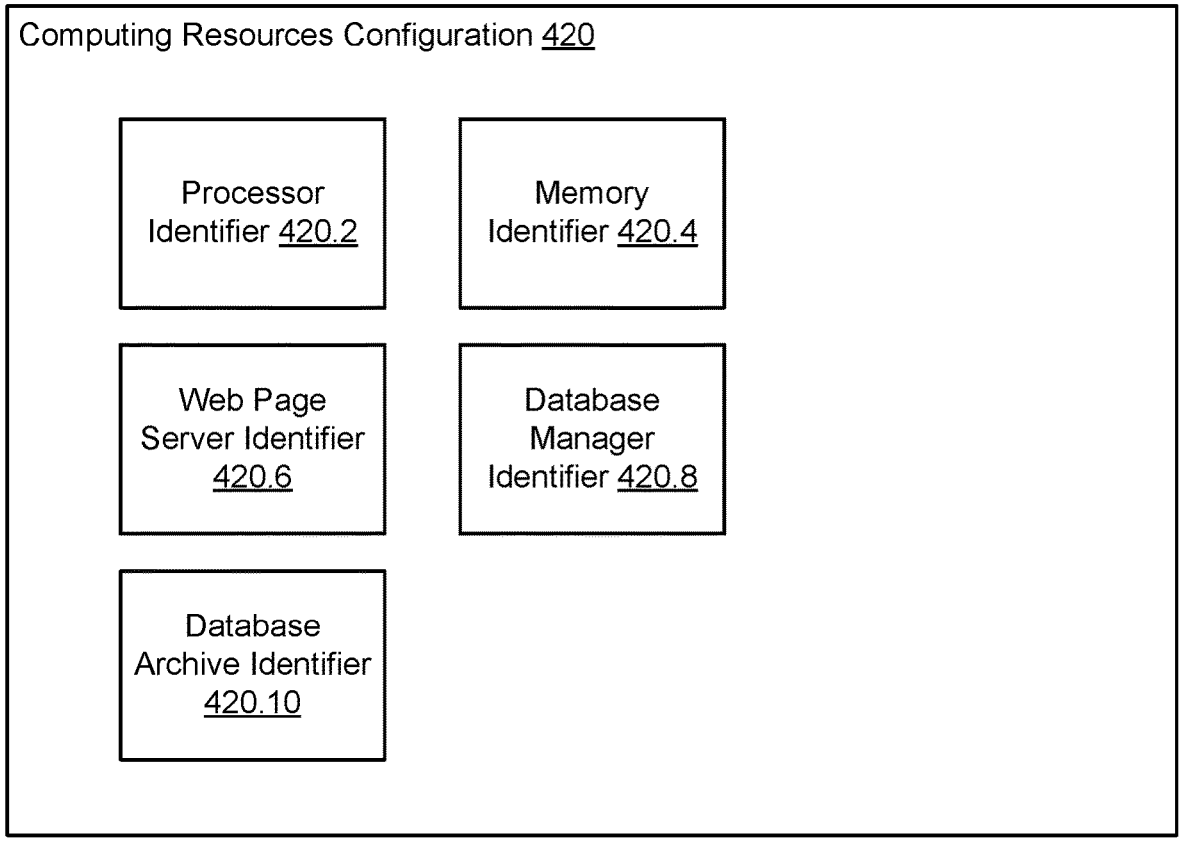
FIG. 4.2

Example Computing Resources 400

- Processor 402.2
- Memory 402.4
- Web Page Server 404.2
- Database Manager 404.4
- Fileserver 404.6
- Computing Resources State Manager 406.2

Persistent Storage 408
- Database Archive 408.2
- File Archive 408.4

FIG. 4.3

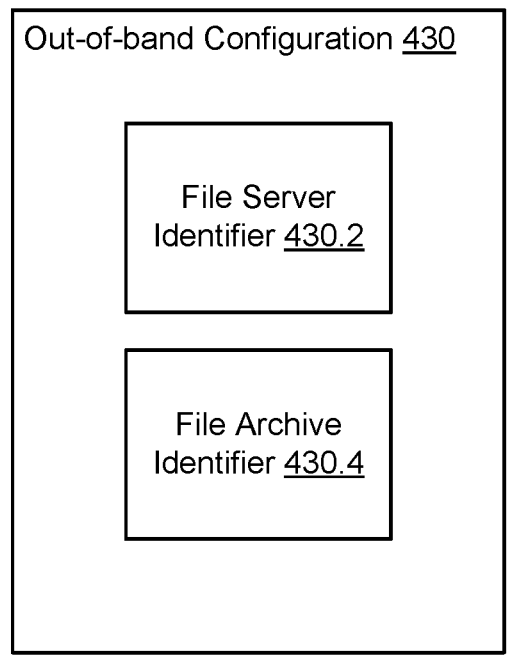
FIG. 4.4

Example Computing Resources 400

- Processor 402.2
- Memory 402.4
- Web Page Server 404.2
- Database Manager 404.4
- Fileserver 404.6
- Computing Resources State Manager 406.2

Persistent Storage 408
- Database Archive 408.2
- ~~File Archive 408.4~~

FIG. 4.5

Example Computing Resources 400

Processor 402.2

Memory 402.4

Web Page Server 404.2

Database Manager 404.4

Fileserver 404.6

Computing Resources State Manager 406.2

Persistent Storage 408

Database Archive 408.2

File Archive 408.4

FIG. 4.6

SYSTEM AND METHOD FOR DEVICE CONFIGURATION UPDATE

BACKGROUND

Computing devices may provide services to other computing devices. For example, a computing device hosting application such as a website server may provide services to other computing devices by serving webpages to the other computing devices. The computing devices may be connected by operable connections such as, for example, the Internet. The computing devices may host any number of applications. Each of applications may provide different types, or the same types, of services.

To modify the behavior of the computing devices, a user may manually change the computing devices. For example, the user may disable hardware components or instantiate executing entities. Such modifications may change the functionality of the computing devices.

SUMMARY

In one aspect, a configurable device for use in a solution architecture in accordance with one or more embodiments of the invention includes computing resources and a computing resources state manager. The computing resources state manager obtains an out-of-band modification to the computing resources; in response to obtaining the out-of-band modification: generates an out-of-band configuration based on the out-of-band modification; and updates restoration information for the computing resources based on the out-of-band configuration.

In one aspect, a method for managing computing resources of a configurable device for use in a solution architecture in accordance with embodiments of the invention includes obtaining, by a computing resources state manager of the configurable device, an out-of-band modification to the computing resources; in response to obtaining the out-of-band modification: generating, by the computing resources state manager of the configurable device, an out-of-band configuration based on the out-of-band modification; and updating, by the computing resources state manager of the configurable device, restoration information for the computing resources based on the out-of-band configuration.

In one aspect, a non-transitory computer readable medium in accordance with one or more embodiments of the invention includes computer readable program code, which when executed by a computer processor enables the computer processor to perform a method for managing computing resources of a configurable device for use in a solution architecture. The method includes obtaining, by a computing resources state manager of the configurable device, an out-of-band modification to the computing resources; in response to obtaining the out-of-band modification: generating, by the computing resources state manager of the configurable device, an out-of-band configuration based on the out-of-band modification; and updating, by the computing resources state manager of the configurable device, restoration information for the computing resources based on the out-of-band configuration.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of computing resources in accordance with one or more embodiments of the invention.

FIG. 1.3 shows a diagram of a solution architecture in accordance with one or more embodiments of the invention.

FIG. 3.1 shows a diagram of a flowchart of a method of generating an out-of-band configuration in accordance with one or more embodiments of the invention.

FIG. 3.2 shows a diagram of a flowchart of a method of managing a configurable device in accordance with one or more embodiments of the invention.

FIG. 4.1 shows a diagram of an example of computing resources.

FIG. 4.2 shows a diagram of an example of a computing resources configuration associated with the computing resources of FIG. 4.1.

FIG. 4.3 shows a diagram of the example of computing resources of FIG. 4.1 after a modification by a user.

FIG. 4.4 shows a diagram of an example of an out-of-band configuration based on the modification of FIG. 4.3.

FIG. 4.5 shows a diagram of the example of computing resources of FIG. 4.3 after a file server failure.

FIG. 4.6 shows a diagram of the example of computing resources of FIG. 4.5 after a computing resources update.

DETAILED DESCRIPTION

Figure 2:
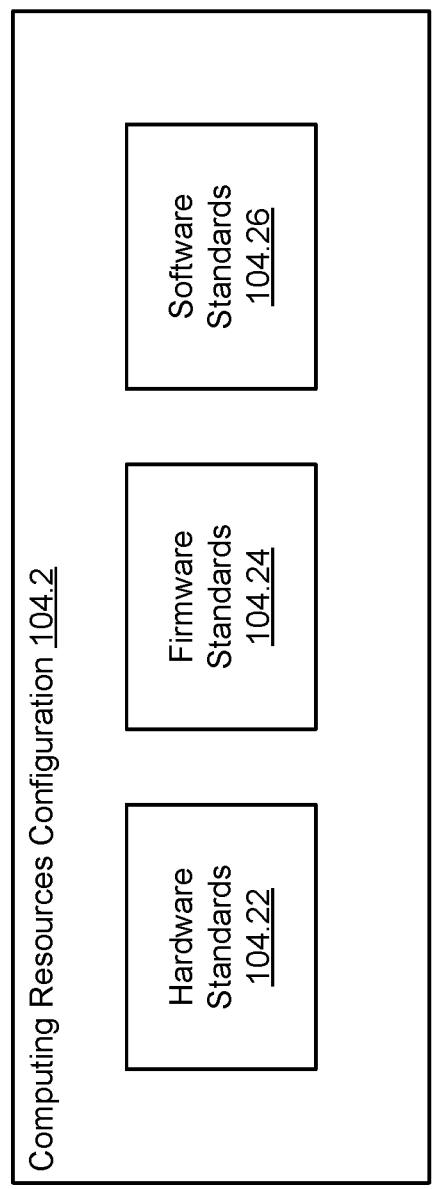
FIG. 2 shows a diagram of a computing resources configuration in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing the state of configurable devices of a solution architecture. A solution architecture may be a distributed system that provides predetermined functionality. The solution architecture may provide such functionality based on cooperative operation of any number of configurable devices of the solution architecture.

In one or more embodiments of the invention, changes to hardware and/or software of the configurable devices are monitored for out-of-band modifications. An out-of-band modification may be a modification that causes the state of the configurable device to diverge from a predetermined state. When out-of-band modifications are identified, out-of-band configurations may be generated. The out-of-band configuration may be stored separately from the configurable device and may be used to restore a state of the configurable device in the event of a partial or total failure (or other event that may alter the functionality of the configurable device) of the configurable device. By doing so, user applied modification or other types of untracked changes to the configurable device may be applied during restoration.

FIG. 1.1 shows a diagram of an example system in accordance with one or more embodiments of the invention. The example system may provide compliance services to a configurable device (100). While illustrated as only including a single configurable device (e.g., 100), systems in accordance with embodiments of the invention may include any number of configurable devices as will be discussed in greater detail with respect to FIG. 1.3.

To provide compliance services to the configurable device (100), the system may further include a configuration data store (120) that provides information required for configuring the configurable device (100) so that the configurable device (100) may participate in a solution architecture. For additional details regarding a solution architecture, refer to FIG. 1.3.

Any of the devices of FIG. 1.1 may be operably connected by any combination of wired and/or wireless networks. For example, the configurable device (100) may be operably connected to the configuration data store (120) and/or other entities (not shown) by a network (130). Additionally, the system may include at least one in-band channel (e.g., 132) associated with the configurable device (100) and at least one out-of-band channel (134) associated with the configurable device (100).

While for the sake of brevity the system of FIG. 1.1 has been illustrated as including a limited number of components, embodiments of the invention may include additional components without departing from the invention. Each component of the system of FIG. 1.1 is described below.

The configurable device (100) may provide services to other entities (not shown). For example, the configurable device (100) may host any number of applications that provide computing services to other entities. The computing services may be, for example, database services, email services, instant messaging services, file storage services, and/or any other type of computer implemented services.

The other entities may be, for example, clients that rely on the services provided by the applications. For additional details regarding clients, refer to FIG. 1.3. Alternatively, the other entities may be, for example, other configurable devices of a distributed system that provides predetermined functionality. For example, the configurable device (100) may be one device of multiple devices of a distributed system. The configurable device (100) may be adapted to receive configuration instructions from other entities to self-configure. Self-configuring the configurable device (100) may place the configurable device (100) into a predetermined state. The predetermined state may enable the configurable device (100) to cooperatively perform functions of the distributed system, i.e., a solution architecture, with other configurable devices of the distributed system.

The configurable device (100) may be a physical device. The physical device may be a computing device. The computing device may be, for example, a mobile phone, tablet computer, laptop computer, desktop computer, server, or cloud resource. The configurable device (100) may be other types of computing devices without departing from the invention. To provide the above-noted functionality of the configurable device (100), the computing device may include computing resources (102) and host an out-of-band management platform (110). Each of these components of the computing device is discussed below.

Figure 5:
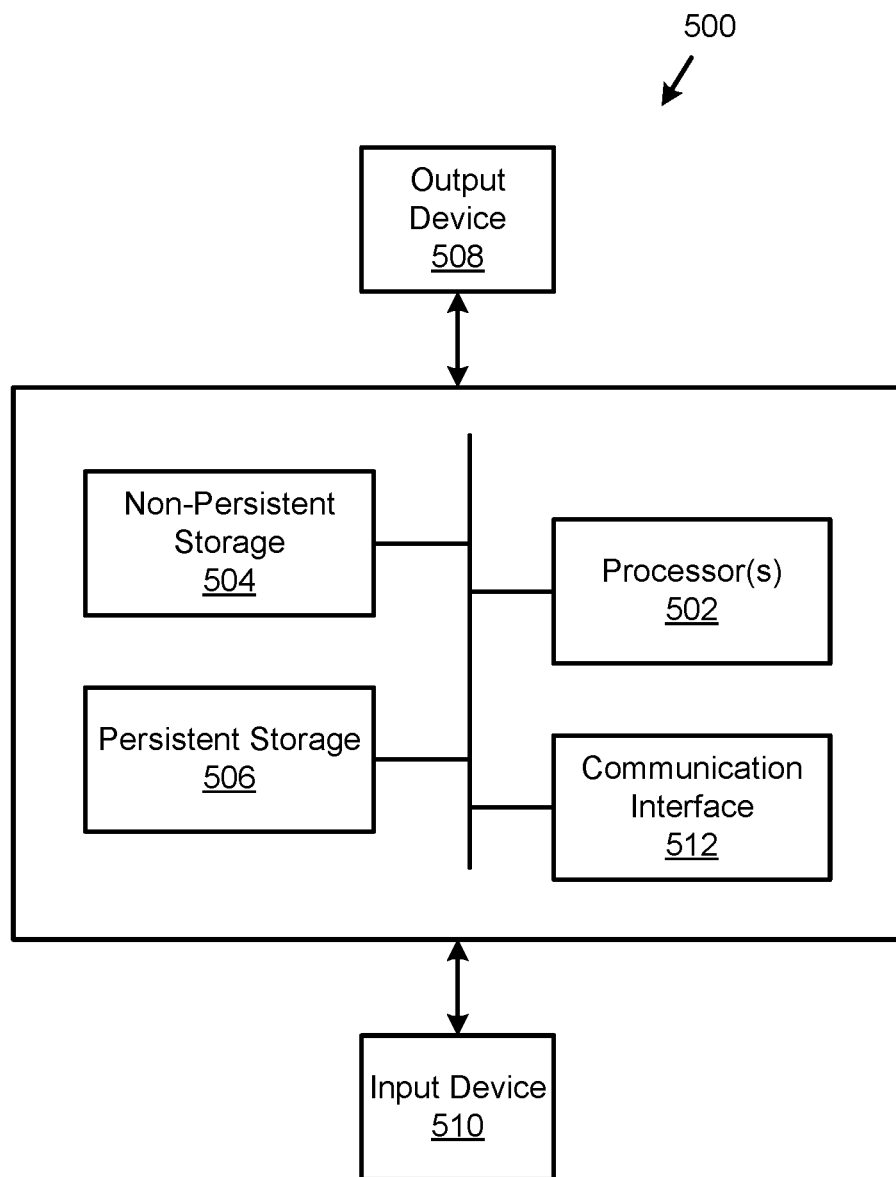
FIG. 5 shows a diagram of a computing device in accordance with one or more embodiments of the invention.

In one or more embodiments of the invention, the computing resources (102) include both physical and logical resources. The physical resources may include one or more processors, memory (e.g., random access memory), and persistent storage (104) (e.g., disk drives, solid state drives, etc.). An example of physical resources of a computing device is shown in FIG. 5. The persistent storage may store computer instructions, e.g., computer code, that when executed by the processor(s) of the computing device cause the computing device to perform the functions of the configurable device (100) described in this application and/or all, or a portion, of the methods illustrated in FIGS. 3.1-3.2. The physical resources may include additional, fewer, or different hardware resources without departing from the invention.

The logical resources may include any number of applications executing using the physical resources of the configurable device (100). Some of these applications may provide services to other entities, as noted above, and other applications may provide compliance services for the computing resources (102) of the configurable device. The compliance services may include, for example, placing the computing resources (102) in a predetermined state, monitoring changes made to the computing resources (102), updating the predetermined state based on the monitored changes, and/or placing the computing resources (102) into an updated predetermined state. For additional details regarding the computing resources (102), refer to FIG. 1.2.

Additionally, the computing resources (102) may support an in-band channel (136). The always-on in-band connection (136) may provide dedicated connectivity between the computing resources (102) and the out-of-band management platform (110). For example, the computing resources (102) may include a network adapter that supports communications via the network (130). Alternatively, the always-on in-band channel may be a bus between the out-of-band management platform (110) and the computing resources (102).

In one or more embodiments of the invention, the out-of-band management platform (110) provides cooperatively provides compliances services to the computing resources (102) in conjunction with entities hosted by the physical resources of the computing resources (102). To cooperatively provide compliance services, the out-of-band management platform (110) may obtain information from the configuration data store (120) used to place the computing resources (102) in predetermined states and/or update information in the configuration data store (120). The updating may be performed based on changes made to the computing resources (102) that modify the state of the computing resources (102) from previously used predetermined states.

To further clarify, consider a scenario in which the computing resources (102) are placed into a predetermined state after the configurable device (100) is first activated. After being placed into the predetermined state, the computing resources (102) may be modified by a user to change a state of the computing resources. If the computing resources (102) were to fail without some record of the modification made by the user, such modifications could be lost. Consequently, if the computing resources are restored to the predetermined state as part of a recovery operation (after the failure), the state of the computing resources may not match the state of the computing resources when the computing resources (102) failed.

By updating the information included in the configuration data store (120), embodiments of the invention may enable the state of the computing resources (102) to be returned to state that matches the state immediately prior to failure of the computing resources (102). Thus, embodiments of the invention may provide an improved configurable device and solution architecture that tolerates out-of-band modifications, e.g., modifications to computing resources that are made without prompting from a management that tracks such changes, by automatically tracking and incorporating relevant changes into information used to manage configurable device states.

Providing compliance services may include (i) monitoring the state of computing resources of a configurable device, (ii) identifying out-of-band state changes to the computing resources based on the monitoring, (iii) updating information used to manage the state of the computing resources based on the out-of-band state changes, and/or (iv) updating the state of the computing resources based on the updated information. By providing compliance enforcement services to the computing resources (102), the configurable device (100) may more efficiently provide predetermined functionality of the configurable device (100) to enable operation of a solution architecture of which the configurable device (100) is a part.

To provide compliance services, the out-of-band management platform (110) may cooperate with entities executing using the computing resources (102). For example, a computing resources state manager hosted by the computing resources may cooperate with the out-of-band management platform (110) to provide compliance services. For additional details regarding the computing resources state manager, refer to FIG. 1.2. To provide the above noted functionality, the out-of-band management platform (110) may perform all, or portion, of the methods illustrated in FIGS. 3.1-3.2.

Additionally, the out-of-band management platform (110) may support an out-of-band channel (134). For example, the out-of-band management platform (110) may include a network adapter, separate from a network adapter of the computing resources (102), which supports communications via the network (130). Further, the out-of-band management platform (110) may support the always-on in-band channel (136) between the out-of-band management platform (110) and the computing resources (102) of the configurable device (100). For example, the out-of-band management platform (110) may be directly connected to the computing resources (102) by a network bus or other communication channel that is not impacted by components external to the configurable device (100).

In some embodiments of the invention, the always-on in-band channel (136) is the same as the in-band channel (132). For example, the computing resources (102) and the out-of-band management platform (110) may each include separate network adapters operably connected via the network (130) and, thereby, provide a communication channel between the computing resources (102) and the out-of-band management platform (110).

In one more embodiments of the invention, the computing resources (102) and the out-of-band management platform (110) are identified as separate devices for networking purposes. For example, each of these components may include separate network identification information such as media access control addresses and/or Internet protocol addresses. Thus, each of these components of the configurable device (100) may present themselves as separate devices to other entities operably connected to the network (130). Additionally, each of these components may be operably connected to the network (130) via different network management devices such as, for example, routers or switches. By doing so, the failure of network management devices operably connected to one of these components may not impact the network connectivity of both components.

The out-of-band management platform (110) may be a physical device. The physical device may be a computing device. The computing device may be, for example, an embedded hardware device such as, for example, an expansion card, a component integrated into a mainboard of a computing device, or another hardware entity. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the out-of-band management platform (110) described in this application and/or all, or a portion, of the methods illustrated in FIGS. 3.1-3.2. The out-of-band management platform (110) may be other types of computing devices without departing from the invention.

While the out-of-band management platform (110) has been described as a physical device, the out-of-band management platform (110) may be implemented as a logical device, e.g., a virtual device, which utilizes computing resources of other physical computing devices without departing from the invention. For example, the out-of-band management platform (110) may be implemented as a logical device that utilizes computing resources of the configurable device (100) or other entities operably connected to the configurable device (100). Further, the out-of-band management platform (110) may be implemented as a management node, i.e., a computing device operably connected to the configurable device (100), or a management console without departing from the invention.

In one or more embodiments of the invention, the configuration data store (120) provides configuration data services to the configurable device (100). By providing configuration data services to the configurable device (100), the configurable device (100) may facilitate management of the state of the computing resources (102). Providing configuration data services to the configurable device (100) may include providing information utilized by the configurable device (100) to configure itself and tracking of out-of-band configurations of the configurable device.

To provide configuration data services to the configurable device (100), the configuration data store (120) may include a persistent storage (122). Information used to provide configuration data services may be included in the persistent storage (122).

For example, the persistent storage (122) may store computing resources configurations (122.2). The computing resources configurations (122.2) may be a data structure that includes information regarding a predetermined state of configurable devices of one or more solution architectures. The information may be hardware, software, firmware, and/or corresponding settings for hardware, software, and/or firmware that when complied with place a configurable device in a predetermined state. The predetermined state may correspond to a state required for a solution architecture. Thus, if the configurable devices of a solution architecture comply with the information included in the computing resource configurations (122.2), the configurable devices may be placed in a state such that the configurable devices cooperatively provide the functionality of the solution architecture.

The persistent storage (122) may also store out-of-band configurations (122.4). The out-or-band configurations (122.4) may be a data structure that includes information regarding out-of-band modifications made to the computing resources (102) that caused the state of the computing resources (102) to diverge from a predetermined state. Such changes may be made by a user to modify the behavior of a solution architecture. Because these changes are out-of-band modifications, the changes would be lost if the computing resources (102) are modified to only comply with the computing resources configurations (122.2). When these changes are made, the changes may be recorded in the out-of-band configurations (122.4).

In one or more embodiments of the invention, the computing resources configurations (122.2) and/or the out-of-band configurations (122.4) are stored as an artifact. An artifact may be a data structure that specifies information regarding a state of a configurable device.

In one or more embodiments of the invention, the computing resources configurations (122.2) and/or the out-of-band configurations (122.4) are stored as scripts. A script may be a data structure that specifies actions. Performing the actions may cause a configurable device to be placed into a state associated with the script when the configurable device is in a second predetermined state. In other words, a script, when executed, may change a predetermined state of a configurable device to another predetermined state. If the configurable device is not in the predetermined state when the script is executed, the configurable device may not be placed in the another predetermined state by execution of the script.

In one or more embodiments of the invention, the configuration data store (120) includes functionality to send and receive data via the network (130) and respond to queries for data from the configurable device (100) and/or other entities. The configuration data store (120) may provide database services, or other data management services, to the configurable device (100) to provide information requested by the configurable device (100) and/or other entities.

While illustrated as being operably connected to a single configurable device (e.g., 100), the configurable device (100) may service any number of configurable devices without departing from the invention. For example, the configuration data store (120) may be operably connected to any number of configurable devices of a solution architecture.

The configuration data store (120) may be a physical device. The physical device may be a computing device. The computing device may be, for example, a mobile phone, tablet computer, laptop computer, desktop computer, server, or cloud resource. The configuration data store (120) may be other types of computing devices without departing from the invention. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the configuration data store (120) described in this application and/or all, or a portion, of the methods illustrated in FIGS. 3.1-3.2. The configuration data store (120) may be other types of computing devices without departing from the invention.

The configuration data store (120) may be a virtualized entity. For example, the configuration data store (120) may be implemented as a virtual machine that utilizes the computing resources of any number of physical computing devices to provide the functionality of the configuration data store (120).

As discussed above, the computing resources (102) may: (i) provide services to other entities via hosted applications and (ii) provide compliance services with respect to the computing resources (102) in cooperation with the out-of-band management platform (110). FIG. 1.2 shows a diagram of computing resources (102) in accordance with one or more embodiments of the invention.

To provide the above noted functions, the computing resources (102) may include application (102.2). The applications (102.2) may be entities hosted by the computing resources (102) that execute using the physical computing resources of the computing resources (102) and/or other entities. Any number of applications (102.2) may be hosted by the computing resources (102). Each of the applications (102.2) may provide any type of computing service to any number and type of entity.

Because of the complicated interactions between the applications (102.2), physical computing resources, and/or other components of the computing resources (102), it may be difficult to predict a behavior of the computing resources (102) when a state of the computing resources has drifted from a predetermined state. To improve the likelihood of efficient and complete functionality of the computing resources (102), the computing resources (102) may include a computing resources state manager (102.4).

The computing resource state manager (102.4) may provide compliance services by modifying other resources, e.g., processors, memory, executing applications, of the computing resources (102). The computing resources state manager (102.4) may provide compliance services by (i) modifying characteristics of the computing resources (102) to match a computing resources configuration (104.2) and/or captured out-of-band configurations and (ii) generate the captured out-of-band configurations based on captured changes made to the characteristics of the computing resources (102) via the out-of-band sources. An out-of-band source may be any source that other than a management entity, e.g., a user, administrator, or other entity that is not trying to place the computing resources (102) in a predetermined state. As noted above, out-of-band sources may be users attempting to modify the computing resources (102) to improve or otherwise modify the functionality of a solution architecture or a configurable device independent of a solution architecture. The out-of-band sources may be sources other than users without departing from the invention. To provide this functionality, the computing resources state manager (102.4) may perform all, or a portion, of the methods illustrated in FIGS. 3.1-3.2.

In one or more embodiments of the invention, the computing resources state manager (102.4) is a physical device.

The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the computing resources state manager (102.4) described throughout this application.

In one or more embodiments of the invention, the computing resources state manager (102.4) is implemented as a logical entity. For example, the computing resources state manager (102.4) may be an application executing using hardware resources, e.g., processor cycles, memory capacity, storage capacity, communication bandwidth, etc., of the computing resources (102).

The computing resources may also include a persistent storage (104). The persistent storage (104) may be a physical device for storing digital data. The persistent storage (104) may include any number of physical devices for storing digital data. The physical devices may be, for example, hard disk drives, solid state drives, tape drives, and any other type of physical device for persistent storage of data.

In one or more embodiments of the invention, the persistent storage (104) is a virtualized resource. For example, the persistent storage (104) may be a virtual drive. The virtual drive may use computing resources of any number of physical computing devices without departing from the invention.

In one or more embodiments of the invention, the persistent storage (104) stores data structures. For example, the persistent storage (104) may store, a computing resources configuration (104.2), captured out-of-band configurations (104.4), application data (104.6), and/or system data (104.8). Each of these data structures is discussed below.

The computing resources configuration (104.6) may be a data structure that includes information regarding a predetermined state of the computing resources (102). The information regarding the predetermined state may specify any number of characteristics of the computing resources (102) that, when met, place the computing resources (102) into the predetermined state. For additional information regarding the computing resources configuration (104.2), refer to FIG. 2.

The captured-out-of-band configurations (104.4) may be a data structure that includes information regarding modifications of the computing resources (102) may be out-of-band entities. The information regarding the modifications may be, for example, the changes that were made, the state prior to the changes that were made, and/or the state after the changes that were made.

In one or more embodiments of the invention, the computing resources configuration (104.6) and/or the captured out-of-band configurations (104.4) are stored as one or more scripts. These scripts may be utilized to place the computing resources (102) into a predetermined state and modify the predetermined state to match that corresponding to a state specified by an out-of-band entity.

The application data (104.6) may be data generated by the applications (102.2). The application data (104.6) may include any type and quantity of data.

The system data (104.6) may be data used by an operating system (not shown) or other management entity hosted by the computing resources (102). The system data (104.6) may be used to operate or otherwise manage the computing resources (102). The system data (104.6) may include, for example, firmware settings, hardware settings, drivers, etc.

While the persistent storage (104) is illustrated as including the limited number of data structures, the persistent storage (104), may store additional, fewer, or different data structures than that illustrated in FIG. 1.2 without departing from the invention. Additionally, any of the data structures illustrated in FIG. 1.2 may be combined with other data, broken down into multiple data structures, stored in different locations, replicated, and/or spanned across any number of computing devices without departing from the invention.

As noted above, configurable devices may be utilized in solution architectures. FIG. 1.3 shows a diagram of a system including a solution architecture (10) in accordance with one or more embodiments of the invention.

The solution architecture (10) may include any number of configurable devices (e.g., 10.2, 10.4). Each of the configurable devices of the solution architecture (10) may be similar to that illustrated in FIG. 1.1.

To provide the functionality of the solution architecture (10), each of the configurable devices may be configured to perform predetermined functionality. For example, configurable device A (10.2) may be configured to provide database services by being placed in a predetermined state that includes a database application hosted by configurable device A (10.2). Configurable device N (10.4) may be configured to provide email services by being placed in a predetermined state that includes an email application hosted by configurable device N (10.4). Thus, the total functionality of the solution architecture (10) may include both database and email services.

The solution architecture (10) may provide services to any number of clients (20). Each of the clients (20) may be a computing device similar to that illustrated in FIG. 5. The clients (20) may obtain such services by communicating with the solution architecture (10) via any number of operable connections. Each of the clients (20) may obtain similar and/or different services from the solution architecture (10). For example, client A (20.2) may obtain database services from the solution architecture (10) while client N (20.4) may obtain email services from the solution architecture (10).

As noted above, when providing services to clients, each configurable device may be placed in predetermined states by being provided compliance services using computing resources configurations that place the configurable devices providing such services into the predetermined states. To further clarify aspects of embodiments of the invention, diagrams of a computing resources configuration (104.2) in accordance with one or more embodiments of the invention is discussed below.

FIG. 2 shows a diagram of a computing resources configuration (104.2) in accordance with one or more embodiments of the invention. As discussed above, the computing resources configuration (104.2) may be a data structure that includes information regarding characteristics of computing resources associated with a predetermined state. The computing resources configuration (104.2) may include hardware standards (104.22), firmware standards (104.24), and software standards (104.26). Each component of the computing resources configuration (104.2) is discussed below.

The hardware standards (104.22) may specify the hardware components necessary to achieve a predetermined state. The hardware standards (104.22) may specify a type and/or quantity of processing resources, memory resources, storage resources, and/or communication resources. The hardware standards (104.22) maybe specified at any level of granularity and in any manner.

The firmware standards (104.24) may specify the firmware necessary to achieve a predetermined state. The firmware standards (104.24) may specify a type and settings of firmware hosted by computing resources. The firmware standards (104.24) maybe specified at any level of granularity and in any manner.

The software standards (104.26) may specify the software necessary to be hosted by computing resources to achieve a predetermined state. The software standards (104.26) may specify a type and settings of software hosted by the computing resources. The software standards (104.26) maybe specified at any level of granularity and in any manner.

As discussed above, the state of computing resources of a configurable device may be managed to prevent state drift. FIGS. 3.1-3.2 shows methods in accordance with one or more embodiments of the invention that may be performed by components of the system of FIG. 1.1. While illustrated as a series of steps, any of the steps shown in FIGS. 3.1-3.2 may be omitted, performed in a different order, and/or performed in a parallel or partially overlapping manner. Further, additional steps, other than those shown in FIGS. 3.1-3.2 may be performed as part of the methods discussed below without departing from the invention.

FIG. 3.1 shows a flowchart of a method in accordance with one or more embodiments of the invention. The method depicted in FIG. 3.1 may be used to manage computing resources of a configurable device in accordance with one or more embodiments of the invention. The method shown in FIG. 3.1 may be performed by, for example, a computing resource state manager (e.g., 102.4, FIG. 1.2). Other components of the system illustrated in FIG. 1.1 may perform the method of FIG. 3.1 without departing from the invention.

In step 300, a computing resources update request is obtained.

In one or more embodiments of the invention, the computing resources update request is obtained as part of a recovery operation from a failure of a configurable device. For example, when a portion of the configurable device fails, computing resources of the configurable device may be placed in the state where execution of applications or otherwise performing the functionality of the configurable device is an efficient and/or impossible. In such a scenario, a restoration of the configurable device may be performed. As part of the restoration process, the computing resources of the configurable device may be needed to be placed in a predetermined state. Alternatively, the configurable device may be replaced by a new configurable device. To provide the same functionality of the configurable device, the computing resources of the new configurable device may need to be placed into the predetermined state. To do so, an entity charged with managing the state of one or more configurable devices may send the computing resources update request.

In one or more embodiments of the invention, the computing resource update request is obtained by the computing resources state manager of the configurable device. For example, the computing resources update request may be obtained by receiving a message addressed to the configurable device via network. While described above as being sent by an entity charged with managing the state of one or more configurable devices, other types of devices may send the computing resources update request without departing from the invention.

In step 302, the computing resources configuration associated with the configurable device hosting the computing resources is obtained.

In one or more embodiments of the invention, the computing resources configuration is obtained from persistent storage of the beauty resources.

In one or more embodiments of the invention, the computing resources configuration is obtained from another entity. For example, the computing resources configuration may be stored in a data store operably connected to the configurable device.

In one or more embodiments of the invention, obtaining the computing resources configuration is orchestrated by an out-of-band management platform hosted by the configurable device. For example, the out-of-band management platform may obtain the computing resources configuration from a data store. After obtaining the computing resources configuration, the out-of-band management platform may store the computing resources configuration in persistent storage of the computing resources and/or other locations.

In one or more embodiments of the invention, the computing resources configuration is obtained based on identity of the configurable device. For example, an identity of the configurable device may be used as a key to retrieve the computing resources configuration from a data store. Each of the computing resources configurations in the data store may be associated with different configurable devices and/or different groups of configurable devices.

For example, the configurable device may be a type of configurable devices of which there are many. A computing resources configuration in the data store may be associated with that type of configurable devices. The data store may provide that computing resources configuration in response to requests that include an identity of that type of configurable device. The configuration data store in accordance with embodiments of the invention may include any number of different computing resources configurations associated with any number and/or type of configurable device.

In step 304, a determination is made regarding whether any out-of-band configurations are associated with the configurable device.

In one or more embodiments of the invention, the determination is made by identifying whether any out-of-band configurations are stored in persistent storage of the computing resources. For example, as will be discussed in greater detail below, out-of-band configurations may be generated by configurable devices.

In one or more embodiments of the invention, the determination is made by identifying whether any out-of-band configurations associated with the configurable device are stored in a configuration data store.

If any out-of-band configurations are stored in persistent storage of the computing resources and/or in the configuration data store, it is determined that an out-of-band configuration is associated with the configurable device.

If an out-of-band configuration is associated with the configurable device, the method may proceed to step 308. If there are no out-of-band configurations associated with the configurable device, the method may proceed to step 306.

In step 306, the computing resources are updated using the computing resources configuration.

In one or more embodiments of the invention, the computing resources are updated by modifying the computing resources to match the computing resources configuration. For example, any number of hardware, software, and/or hardware/software settings of computing resources of the configurable device may be modified so that they match the computing resources configuration.

The method may end following step 306.

Returning to step 304, the method may proceed to step 308 if there is an out-of-band configuration associated with the configurable device.

In step 308, the computing resources are updated using: (i) the computing resources configuration and (ii) the out-of-band configurations.

In one or more embodiments of the invention, the computing resources are updated by modifying been resources to match both the computing resources configuration and the out-of-band configurations. For example, the computing resources configuration and the out-of-band configurations may specify any number of characteristics of hardware, software, and/or hardware/software settings of the computing resources of the configurable device. The characteristics of the hardware, software, and/or hardware/software settings of the computing resources may be modified to match these characteristics.

In one or more embodiments of the invention, the computing resources configuration is a data structure including specifications generated by an in-band entity. An in-band entity may be an entity tasked with specifying a configuration for all configurable devices of a particular type.

In one or more embodiments of the invention, the out-of-band configurations are data structures including specifications generated by a particular configurable device. For example, when a user of the configurable device changes characteristics of the community resources of the configurable device, these modifications may be tracked and stored as out-of-band configurations. The stored out-of-band configurations may specify the modifications that were made and/or the state of the bidding resources prior to the modifications and/or the state of the computing resources after the modifications. The out-of-band configurations include any number of such modifications made over any period of time.

In one or more embodiments of the invention, the computing resources configuration and the out-of-band configurations are scripts. To update the computing resources, the computing resources configuration and the out-of-band configurations may be merged and executed. Executing the merged scripts may modify the computing resources to meet the requirements of a predetermined state.

In one or more embodiments of the invention, merging the computing resources configuration and out-of-band configurations includes partially reordering steps specified by computing resources configuration and the out-of-band configurations. For example, the computing resources configuration may specify ten steps be performed in a particular order that placed the computing resources of the configurable device into a predetermined state. The out-of-band configurations may specify three steps to be performed in a particular order but that the steps must be performed after five of the steps computing resources configuration are performed and before the remaining five steps of the computing resources configuration are performed. Thus, a reordering of portions of each of the scripts may be performed when merging the scripts. While described here via a simple example, any number of steps from any number of computing resources configurations and out-of-band configurations may be reordered when merging without departing from the invention.

The method may end following step 308.

FIG. 3.2 shows a flowchart of a method in accordance with one or more embodiments of the invention. The method depicted in FIG. 3.2 may be used to generate an out-of-band configuration in accordance with one or more embodiments of the invention. The method shown in FIG. 3.2 may be performed by, for example, a computing resource state manager (e.g., 102.4, FIG. 1.2). Other components of the system illustrated in FIG. 1.1 may perform the method of FIG. 3.2 without departing from the invention.

In step 310, an out-of-band modification to computing resources of a configurable device is obtained.

In one or more embodiments of the invention, the out-of-band modification is obtained by monitoring the state of the computing resources to identify a change to the computing resources. In response to identifying the change in the computing resources, the changed state of the computing resources may be compared to the computing resources configuration associated with the configurable device to identify whether the changed state diverges from the characteristics specified by the computing resources configuration.

In one or more embodiments of the invention, any divergence from characteristics specified by the computing resources is considered an out-of-band modification.

In one or more embodiments of the invention, any divergences from the characteristics specified by the computing resources are compared to a list of material changes. The material changes may be specified by the computing resources configuration and represent a subset of the characteristics specified by the computing resources configuration. This subset of the characteristics may represent any divergences that would cause the configurable device to be completely unable to perform a particular function that is important to a solution architecture. In contrast, the characteristics specified by the computing resources configuration that are not part of the subset may only cause the configurable device to perform a particular function less efficiently if computing resources diverge from the characteristic. The material changes list may include any number of material and non-material changes.

For example, a material change may be a specification of the computing resources configuration that requires the computing resources to include at least one processing core. In contrast, a non-material change may be a specification of the computing resources configuration that requires the computing resources to host a media server application.

In step 312, and out-of-band configuration is generated based on the out-of-band modification.

In one or more embodiments of the invention, the out-of-band configuration is generated by storing information representing a final state of a portion of the computing resources that were impacted by the out-of-band modification.

In one or more embodiments of the invention, the out-of-band configuration is generated by generating a script representing the out-of-band modification. For example, the script may specify a state of a portion of computing resources prior to modification, the modification, and/or the state of the portion of computing resources after the modification. In one or more embodiments of the invention, executing the script causes a modification of computing resources that changes the state of a portion of the computing resources to match the state of the portion of the computing resources after the out-of-band modification so long as the portion of the computing resources were in a state corresponding to the state of the portion of the computing resources prior to the out-of-band modification.

In step 314, the out-of-band configuration is stored.

In one or more embodiments of the invention, the out-of-band configuration is stored in persistent storage of the computing resources.

In one or more embodiments of the invention, the out-of-band configuration is stored in a configuration data store. For example, an out-of-band management platform may monitor the computing resources and store copies of the out-of-band configuration in the configuration data store after the out-of-band configuration is generated. The out-of-band management platform may store the out-of-band configuration in the configuration data store via an out-of-band channel.

In another example, the out-of-band configuration may be stored in the configuration data store by the computing resources. For example, the computing resources may store the out-of-band configuration in the configuration data store via an in-band channel.

The method may end following step 314.

To further clarify aspects of embodiments of the invention, a non-limiting example is provided in FIGS. 4.1-4.6. In FIGS. 4.1-4.6, a system similar to the system of FIG. 1.1 is illustrated. However, for the sake of brevity only a limited number of components of the system of FIG. 1.1 is shown in FIGS. 4.1-4.6.

Example

Consider a scenario as illustrated in FIG. 4.1 in which example computing resources (400) of a configurable device (not shown) are performing operations as part of a solution architecture. In this example, the solution architecture supports an organization's backend infrastructure by serving webpages including relevant company information.

To support the operations of the configurable device, at the point in time of FIG. 4.1, the example computing resources (400) includes a first processor (402.2), memory (402.4), and a persistent storage (408). To support the solution architecture, a webpage server (404.2) that serves pages using information included in a database archive (408.2) managed by a database manager (404.4) are hosted using the hardware components of the example computing resources (400). The example computing resources (400) further include a computing resources state manager (406.2) for managing the state of the example computing resources (400).

In this configuration, the example computing resources (400) matches the requirements of the computing resources configuration (420) illustrated in FIG. 4.2. The computing resources configuration (420) includes a processor identifier (420.2), a memory identifier (420.4), a web page server identifier (420.6), a database manager identifier (420.8), and a database archive identifier (420.10). Thus, if the example computing resources fail, they may be returned to a predetermined state by forcing compliance on the computing resources configuration (420).

To further expand and improve the functionality of the solution architecture, a user instantiates a file server (404.6) in the example computing resources (400) and, in turn, the file server (404.6) generates a file archive (408.4) as shown in FIG. 4.3. In response to the instantiation of the file server (404.6), the computing resources state manager (406.2) identifies that an out-of-band change to the example computing resources (400) has been made. In response the identification, the computing resources state manager (406.2) generates and out-of-band configuration (430) as shown in FIG. 4.4. The out-of-band configuration (430) includes a file server identifier (430.2) and a file archive identifier (430.4).

After generating the out-of-band configuration (430), the file archive (408.4) fails due to a faulty disk drive of the persistent storage (408) as shown in FIG. 4.5. In response to the failure of the file archive (408.4), a management entity (not shown) sends the computing resources update request to the computing resources state manager (406.2).

In response to receiving the computing resources update request, the computing resources state manager (406.2) obtains the computing resources configuration shown in FIG. 4.2 an out-of-band configuration shown in FIG. 4.4. The out-of-band configuration is obtained from a configuration data store (not shown) in which the out-of-band configuration was stored after it was generated.

Using the obtained computing resources configuration and to the out-of-band configuration, the computing resources state manager (406.2) enforces the configuration on the example computing resources (400) resulting in the file archive (408.4) being instantiated as shown in FIG. 4.6.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device. The communication interface (512) may include a network adapter or other hardware element that supports communications via any type of networking technology/standard.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may improve the field of distributed system technology. Specifically, embodiments of the invention may improve distributed system technology by automatically capturing out-of-band modifications made to configurable devices of a distributed system. By doing so, the state of configurable devices of distributed systems may be restored to predetermined state of the configurable device immediately preceding a failure—partial or total—of the configurable device.

Embodiments of the invention may also improve the reliability of distributed systems. For example, by automatically ensuring restore ability of the states of configurable devices, portions the distributed systems that may fail are able to be restored without loss of state information. In contrast, contemporary distributed systems the unable to handle or otherwise ensure proper restoration when out-of-band modifications have been made to a configurable device.

Thus, embodiments of the invention may address a technological problem, e.g., failure of components of a distributed system that would impede operation of the distributed system, that arise due to the nature of the technological environment, e.g., reliance of distributed system on a number of components. Embodiments of the invention may improve such system by improving the fault tolerance of such systems by monitoring out-of-band modifications and generating restoration information based on the out-of-band modifications.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of a configurable device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A configurable device for use in a solution architecture, comprising:
    computing resources; and
    a hardware processor hosting a computing resources state manager programmed to:
        obtain an out-of-band modification to the computing resources;
        in response to obtaining the out-of-band modification:
            generate an out-of-band configuration based on the out-of-band modification;
            update restoration information for the computing resources based on the out-of-band configuration;
        prior to obtaining the out-of-band modification:
            obtain a computing resources update request for the computing resources;
            in response to obtaining the computing resources update request:
                obtain a computing resources configuration associated with the configurable device;
                make a determination that no out-of-band configuration for the configurable device exists; and
                update, based on the determination, the computing resources based on the computing resources configuration.

2. The configurable device of claim 1, wherein obtaining the out-of-band modification to the computing resources comprises:
    identifying a state change of the computing resources by an entity other than the computing resources state manager resulting in a new state of the computing resources;
    making a second determination that the new state does not match a state specified by a second computing resources configuration associated with the configurable device; and
    use the state change as the out-of-band modification in response to the second determination.

3. The configurable device of claim 1, wherein the computing resources state manager is further programmed to:
    obtain a second computing resources update request for the computing resources;
    in response to obtaining the second computing resources update request:
        obtain a second computing resources configuration associated with the configurable device;
        make a second determination that the out-of-band configuration exists; and
        update, based on the second determination, the computing resources based on both of the second computing resources configuration and the existence of the out-of-band configuration.

4. The configurable device of claim 3, further comprising:
    an out-of-band management platform programmed to:
        store a copy of the out-of-band configuration in a configuration data store.

5. The configurable device of claim 4, wherein the computing resources configuration is obtained from the configuration data store, wherein the configuration data store is a separate computing device from the configurable device and stores information used to configure configurable devices of the solution architecture.

6. The configurable device of claim 4, wherein the restoration information comprises the out-of-band configuration and the computing resources configuration.

7. The configurable device of claim 1, wherein the out-of-band modification is a modification of the computing resources that causes the configurable device to diverge from a predetermined state.

8. A method for managing computing resources of a configurable device for use in a solution architecture, comprising:
    obtaining, by a computing resources state manager of the configurable device, an out-of-band modification to the computing resources;
    in response to obtaining the out-of-band modification:
        generating, by the computing resources state manager of the configurable device, an out-of-band configuration based on the out-of-band modification;
        updating, by the computing resources state manager of the configurable device, restoration information for the computing resources based on the out-of-band configuration;
    prior to obtaining the out-of-band modification and by the computing resources state manager:
        obtaining a computing resources update request for the computing resources;
        in response to obtaining the computing resources update request:
            obtaining a computing resources configuration associated with the configurable device;

making a determination that no out-of-band configuration for the configurable device exists; and
updating, based on the determination, the computing resources based on the computing resources configuration.

9. The method of claim 8, wherein obtaining the out-of-band modification to the computing resources comprises:
identifying, by the computing resources state manager of the configurable device, a state change of the computing resources by an entity other than the computing resources state manager resulting in a new state of the computing resources;
making a second determination, by the computing resources state manager of the configurable device, that the new state does not match a state specified by a second computing resources configuration associated with the configurable device; and
using the state change as the out-of-band modification in response to the second determination.

10. The method of claim 8, further comprising:
obtaining, by the computing resources state manager of the configurable device, a second computing resources update request for the computing resources;
in response to obtaining the second computing resources update request:
obtaining, by the computing resources state manager of the configurable device, a second computing resources configuration associated with the configurable device;
making a second determination, by the computing resources state manager of the configurable device, that the out-of-band configuration exists; and
updating, by the computing resources state manager of the configurable device and based on the second determination, the computing resources based on both of the second computing resources configuration and the existence of the out-of-band configuration.

11. The method of claim 8, further comprising:
storing, by the computing resources state manager of the configurable device, a copy of the out-of-band configuration in a configuration data store.

12. The method of claim 11, wherein the computing resources configuration is obtained from the configuration data store, wherein the configuration data store is a separate computing device from the configurable device and stores information used to configure configurable devices of the solution architecture.

13. The method of claim 11, wherein the restoration information comprises the out-of-band configuration and the computing resources configuration.

14. The method of claim 8, wherein the out-of-band modification is a modification of the computing resources that causes the configurable device to diverge from a predetermined state.

15. A non-transitory computer readable medium comprising computer readable program code, which when executed by a computer processor enables the computer processor to perform a method for managing computing resources of a configurable device for use in a solution architecture, the method comprising:
obtaining, by a computing resources state manager of the configurable device, an out-of-band modification to the computing resources;
in response to obtaining the out-of-band modification:
generating, by the computing resources state manager of the configurable device, an out-of-band configuration based on the out-of-band modification;
updating, by the computing resources state manager of the configurable device, restoration information for the computing resources based on the out-of-band configuration;
prior to obtaining the out-of-band modification and by the computing resources state manager:
obtaining a computing resources update request for the computing resources;
in response to obtaining the computing resources update request:
obtaining a computing resources configuration associated with the configurable device;
making a determination that no out-of-band configuration for the configurable device exists; and
updating, based on the determination, the computing resources based on the computing resources configuration.

16. The non-transitory computer readable medium of claim 15, wherein obtaining the out-of-band modification to the computing resources comprises:
identifying, by the computing resources state manager of the configurable device, a state change of the computing resources by an entity other than the computing resources state manager resulting in a new state of the computing resources;
making a second determination, by the computing resources state manager of the configurable device, that the new state does not match a state specified by a second computing resources configuration associated with the configurable device; and
using the state change as the out-of-band modification in response to the second determination.

17. The non-transitory computer readable medium of claim 15, wherein the method further comprises:
obtaining, by the computing resources state manager of the configurable device, a second computing resources update request for the computing resources;
in response to obtaining the second computing resources update request:
obtaining, by the computing resources state manager of the configurable device, a second computing resources configuration associated with the configurable device;
making a second determination, by the computing resources state manager of the configurable device, that the out-of-band configuration exists; and
updating, by the computing resources state manager of the configurable device and based on the second determination, the computing resources based on both of the second computing resources configuration and the existence of the out-of-band configuration.

18. The non-transitory computer readable medium of claim 15, wherein the method further comprises:
storing, by the computing resources state manager of the configurable device, a copy of the out-of-band configuration in a configuration data store.

19. The non-transitory computer readable medium of claim 18, wherein the computing resources configuration is obtained from the configuration data store, wherein the configuration data store is a separate computing device from the configurable device for storing information used to configure configurable devices of the solution architecture.

20. The non-transitory computer readable medium of claim 15, wherein the out-of-band modification is a modification of the computing resources that causes the configurable device to diverge from a predetermined state.

\* \* \* \* \*